April 5, 1938.   P. B. SKINNER   2,113,098
PACKER
Filed July 5, 1935

INVENTOR
Percy B. Skinner
BY
ATTORNEY

Patented Apr. 5, 1938

2,113,098

UNITED STATES PATENT OFFICE 2,113,098

PACKER

Percy B. Skinner, Tulsa, Okla.

Application July 5, 1935, Serial No. 29,933

2 Claims. (Cl. 286—31)

This invention relates to new and useful improvements in packers.

One object of the invention is to provide an improved packer which is particularly adapted for use in packing off the polish rod of an oil well, or other element.

An important object of the invention is to provide an improved packer including a plurality of superimposed packing rings which are arranged to surround an element extending through the packer, the rings having their upper and lower peripheral surfaces convex whereby the line of contact between said rings is comparatively small, and also whereby annular spaces or channels are formed between the rings, which provides ample distortion space when pressure is applied to said rings to move them into packing relation with said element.

Another object of the invention is to provide an improved packer including a plurality of superimposed resilient rings adapted to engage the outer surface of a reciprocating element to pack off the same, said rings being so constructed that only a minimum pressure is necessary to distort said rings into packing position, the distortion of the rings causing the entire inner surface of each ring to engage the element, whereby an equal packing action throughout the length of the rings is had, which provides for a maximum packing area.

A further object of the invention is to provide a plurality of superimposed resilient rings which surround a reciprocating element and which, when distorted, move into packing engagement with the element, said rings being constructed so as to positively engage the element without pulling away from said element due to the pressure attempting to escape thereby, which affords a perfect seal, the construction of said rings further permitting a limited lateral movement or wobble of the element without breaking said seal.

A construction designed to carry out the invention will be hereinafter described, together with other features of the invention.

Figure 1:
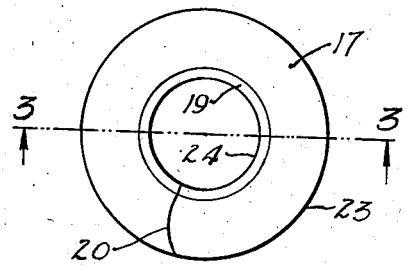
Figure 2:
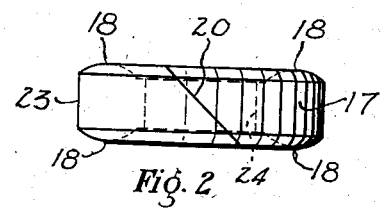
Figure 4:
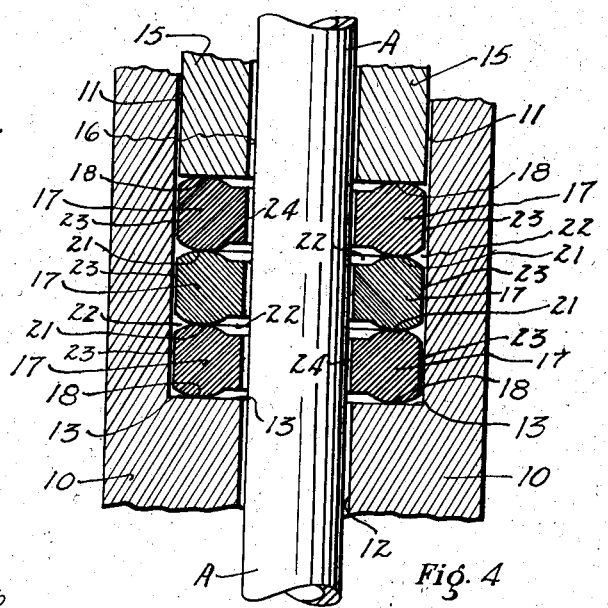
Figure 5:
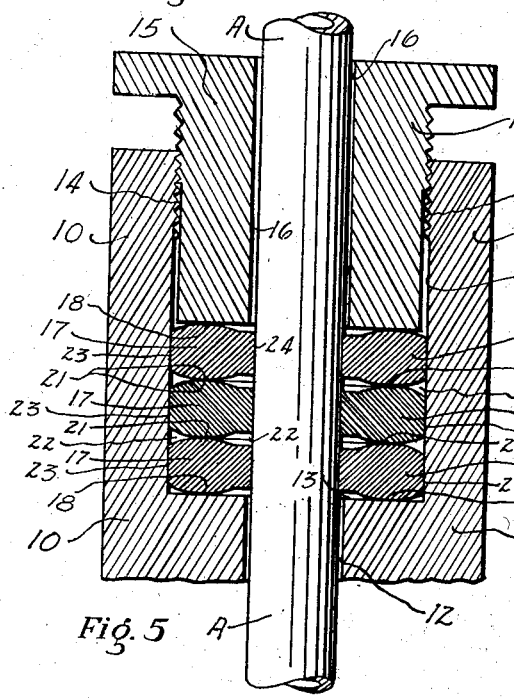
Figure 3:
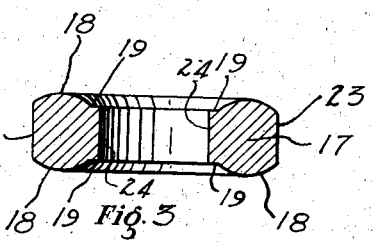

The invention will be more readily understood from a reading of the following specification and by reference to the accompanying drawing, in which an example of the invention is shown, and wherein:

Figure 1 is a plan view of one of the packing rings, constructed in accordance with the invention, Figure 2 is a side elevation, Figure 3 is a transverse, vertical sectional view taken on the line 3—3 of Figure 1, Figure 4 is a transverse, vertical, sectional view of a stuffing box having a plurality of said rings mounted therein, and showing said rings in a normal position, and Figure 5 is a view similar to Figure 4 and showing the packing rings distorted into packing engagement with the polish rod.

In the drawing, the numeral 10 designates a cylindrical body, or housing which is provided with an axial bore 11. The lower end of the bore is reduced at 12 to form an internal, annular shoulder 13 within the body. The upper end of the bore is provided with screw-threads 14, whereby a follower 15 may be threaded thereinto.

The follower is formed with an axial bore 16 which has the same diameter as the diameter of the reduced portion 12 of the bore of the housing. Thus, a polish rod A, or other element may pass upwardly through the housing and through the follower. It is noted that the element has a loose fit in the reduced portion 12 and the bore 16 of the follower because the diameter of said element is less than the diameter of said reduced portion and said bore. The above described parts are of the ordinary construction and are, therefore, subject to variation.

In carrying out the invention, a plurality of resilient packing rings 17 are superimposed within the bore 11, the lowermost ring being supported on the annular shoulder 13. The rings may be constructed of rubber, rubber compound, or other suitable material, and, as clearly shown in Figures 4 and 5, completely encircle the polish rod A. Since each ring is constructed in exactly the same way, it is believed that a description of one will suffice.

Each ring has its upper and lower faces convex, or curved outwardly at 18 (Figure 3). This convex portion does not extend the entire width of the ring and thus an annular shoulder 19 is formed at the inner edge portion of the top and bottom of the ring. The ring is provided with an inclined radial slit 20 which extends the width of the ring and facilitates the positioning of the rings around the rod and in the bore of the housing.

When the rings have been placed in the bore 11 of the body, as shown in Figure 4, it will be seen that the lowermost ring rests on the shoulder 13, while the other rings are supported on each other. Due to the curved or convex portion 18 of each ring it will be obvious that there is only an annular line of contact 21, at the top of the curve, between each ring. Thus, annular spaces or channels 22 are formed at the inner and outer edges of the rings between said rings.

When the rings are in a normal position, they are in the position shown in Figure 4, with their outer peripheries 23 disengaged from the bore 11, and their inner peripheries 24 disengaged from the rod.

When the follower 15 is rotated to move downwardly into the bore of the body, the lower end of said follower engages the convex portion 18 of the uppermost packing ring 17, thereby compressing the rings between the follower and shoulder 13. As the endwise pressure on said rings is increased, it will be seen that the rings will be distorted with laterally spreading flow both inwardly and outwardly on opposite sides of the annular initial line of contact between the convex end faces of the rings. Since the annular spaces or channels are provided, the rings will naturally distort into these spaces because of the lack of resistance. Thus, the concentration of the pressure at the middle of the annular convex end portions of the ring, together with the provision of the annular spaces or channels, causes the rings to be distorted so that the entire inner peripheral face 24 snugly engages the surface of the polish rod A. At the same time, the entire outer peripheral face 23 of each ring moves into close engagement with the bore 11 of the housing (Figure 5).

So long as the follower is in a lowered position the rings remain in their packing position and fluid cannot by-pass the rod. Since the entire peripheral faces of the rings engage the rod A and bore 11, it is obvious that the maximum packing area of each is utilized. Further, since the endwise pressure is applied to each ring in the region of the initial annular median line of contact between the convex end faces of the adjoining rings, and due to the annular channels which permit ready distortion, only a minimum of pressure need be exerted to move the rings into their packing position.

It is noted that when the rings are distorted into the packing relation (Figure 5), the annular spaces or channels are not completely filled with the distorted material of the rings. This permits the rod A which is loose in the reduced portion 12 of the body bore and in the bore 16 of the follower, to undergo a limited lateral movement, without breaking the seal. Such lateral movement would merely distort the rings further into the channels. This lateral movement, or wobbling occurs in the polish rod of an oil well and thus, it will be seen the invention is particularly adapted for such use, although it is not to be so limited as it may be used elsewhere.

It is further pointed out that due to the single initial contact line 21 between the rings, a pressure maintained on said rings in the region of said line on opposite sides thereof causes them to be distorted equally, whereby equal packing throughout the entire length of the packing rings is had.

The pressure, as has been pointed out, is applied medially to the annular convex end faces of each ring and, therefore, the inner peripheral face 24 of each ring is held in tight engagement with the surface of the rod A and the outer peripheral face 23 of the ring in engagement with the cylindrical wall of the body 10. Therefore, the pressure of fluid against the packing rings cannot force the lowermost packing ring to pull away from the surface of the rod A, as is the case in the flat packing rings of the usual construction. Although three packing rings 17 have been shown, it is pointed out that any number may be employed. Further, the rings are not to be limited to packing off a polish rod but may be utilized in any suitable way for any desired purpose.

What I claim and desire to secure by Letters Patent is:

1. A rod packing comprising a plurality of deformable solid rings of rubber or like material, each ring having annular convex opposite end faces joined at their outer margins by a cylindrical peripheral surface and at their inner margins by substantially radial flat annular opposite end faces which terminate at and join a cylindrical bore, said rings being adapted to be disposed in a stuffing box and surround a rod therein with their convex end face portions superposed and in substantially medial annular line engagement with each other, and means for applying endwise pressure to said rings throughout the body portions thereof in the region of said line engagement of the annular convex end portions of the rings sufficient to effect an intimate engagement of the peripheral surfaces of the rings with the rod and the wall of the stuffing box through distortion of the component material of the rings with laterally spreading flow thereof.

2. A deformable solid packing ring of rubber or like material, having a cylindrical outer peripheral face, a cylindrical bore, annular convex opposite end faces adjacent to and joining at their outer margins with the cylindrical outer peripheral face of the ring, and substantially radial flat annular opposite end faces adjacent to and joining at their inner margins with the cylindrical bore of the ring, said flat faces joined at their outer margins with the inner margins of said convex annular end faces of the ring, said ring in use being subjected to endwise pressure medially and concentrically of its convex annular end portions and thereby distorted with laterally spreading flow of the component material throughout the entire body whereby to effect an intimate engagement of the outer peripheral and the bore surfaces of the ring respectively with the wall of the stuffing box and a rod therein.

PERCY B. SKINNER.